United States Patent [19]

Shima et al.

[11] Patent Number: 5,931,011
[45] Date of Patent: Aug. 3, 1999

[54] LOW TEMPERATURE STORAGE CABINET

[75] Inventors: Tsuyoshi Shima; Tomio Suyama, both of Shimane-ken, Japan

[73] Assignee: Hoshizaki Denki Kabushiki Kaisha, Toyoake, Japan

[21] Appl. No.: 09/102,635

[22] Filed: Jun. 23, 1998

[51] Int. Cl.[6] .................................................. F25D 17/00
[52] U.S. Cl. .............................. 62/182; 62/157; 62/186; 62/228.1; 165/269
[58] Field of Search .............................. 62/157, 180, 182, 62/186, 207, 228.1, 228.3, 229; 165/269, 299

[56] References Cited

U.S. PATENT DOCUMENTS

| | | | |
|---|---|---|---|
| 3,733,841 | 5/1973 | Gelbard ................................. | 62/157 X |
| 4,467,617 | 8/1984 | Morgan, Jr. et al. ..................... | 62/180 |
| 4,481,787 | 11/1984 | Lynch ...................................... | 62/180 |
| 4,485,633 | 12/1984 | King et al. .............................. | 62/180 |
| 5,255,530 | 10/1993 | Janke ...................................... | 62/180 |
| 5,490,394 | 2/1996 | Marques et al. ......................... | 62/186 |
| 5,782,101 | 7/1998 | Dennis .................................... | 62/186 |

FOREIGN PATENT DOCUMENTS 62-29909  7/1987  Japan.

*Primary Examiner*—Henry Bennett
*Assistant Examiner*—Susanne C Tinker
*Attorney, Agent, or Firm*—Nikaido, Marmelstein, Murray & Oram LLP

[57] ABSTRACT

A low temperature storage cabinet having a freezing cycle system composed of a compressor, a condenser, a throttle and an evaporator, a cabinet temperature sensor for detecting an inside temperature of the cabinet, and an electric fan provided in the cabinet for circulating cooled air in the interior of the cabinet, wherein the compressor in the freezing cycle system is activated in response to rise of the inside temperature of the cabinet and deactivated in response to a fall in the inside temperature of the cabinet, and wherein the rate of operation of the electric fan is decreased in accordance with a decrease of temperature or pressure of refrigerant in the freezing cycle system during deactivation of the compressor to thereby reduce consumption of the electric power.

10 Claims, 14 Drawing Sheets

LOW TEMPERATURE STORAGE CABINET

BACKGROUND OF THE INVENTION

1. Field of the Invention

The present invention relates to a low temperature storage cabinet such as a refrigerator, a freezer or the like in which operation of a refrigerant compressor in a freezing cycle system is controlled to maintain the interior of the cabinet at a predetermined low temperature, and more particularly to a low temperature storage cabinet in which the rate of operation of an electric fan in the cabinet is controlled during deactivation of the compressor.

2. Description of the Prior Art

Disclosed in Japanese Utility Model Publication No. 62-29909 is a low temperature storage cabinet of this kind in which the electric fan in the cabinet is operated only for a period of time set by a start switch during deactivation of the compressor for decreasing a difference in temperature between upper and lower compartments in the cabinet and is stopped only for a period of time set by a stop switch for saving the electric power.

In the conventional low temperature storage cabinet, a difference in temperature between the upper and lower compartments in the cabinet is estimated by a user for setting each period of time for control of the electric fan in the cabinet. If there is an error in estimation of the difference in temperature between the upper and lower compartments or the period of time is erroneously determined by the user, the difference in temperature between the upper and lower compartments becomes large, and consumption of the electric power may not be properly reduced in accordance with the inside temperature of the cabinet.

SUMMARY OF THE INVENTION

It is, therefore, a primary object of the present invention to provide a low temperature storage cabinet when operation of electric fan in the cabinet is controlled in accordance with a difference in pressure between upper and lower compartments of the cabinet to reduce consumption of the electric power without causing any problem discussed above.

According to the present invention, the object is accomplished by providing a low temperature storage cabinet having a freezing cycle system composed of a compressor, a condenser, a throttle and an evaporator, a cabinet temperature sensor for detecting an inside temperature of the cabinet and for producing an electric signal indicative of the detected inside temperature, compressor control means responsive to the electric signal from the temperature sensor for activating the compressor in the freezing cycle system in response to rise of the inside temperature of the cabinet and for deactivating the compressor in response to a fall in the inside temperature of the cabinet, and an electric fan provided in the cabinet for circulating cooled air in the interior of the cabinet, wherein the low temperature storage cabinet comprises refrigerant temperature detection means provided in the freezing cycle system to detect a temperature of refrigerant in the freezing cycle system, and fan control means for controlling operation of the electric fan in the cabinet in accordance with a temperature of refrigerant detected by the detection means during deactivation of the compressor and for decreasing the rate of operation of the electric fan in accordance with a decrease of the refrigerant temperature.

According to an aspect of the present invention, there is provided a low temperature storage cabinet having a freezing cycle system composed of a compressor, a condenser, a throttle and an evaporator, a cabinet temperature sensor for detecting an inside temperature of the cabinet and for producing an electric signal indicative of the detected inside temperature, compressor control means responsive to the electric signal from the temperature sensor for activating the compressor in the freezing cycle system in response to rise of the inside temperature of the cabinet and for deactivating the compressor in response to a fall in the inside temperature of the cabinet, and an electric fan provided in the cabinet for circulating cooled air in the interior of the cabinet, wherein the low temperature storage cabinet comprises refrigerant pressure detection means provided in the freezing cycle system for detecting pressure of refrigerant in the freezing cycle system, and fan control means for controlling operation of the electric fan in the cabinet in accordance with refrigerant pressure detected by the pressure detection means during deactivation of the compressor and for decreasing the rate of operation of the electric fan in accordance with a decrease of the refrigerant pressure.

According to another aspect of the present invention, there is provided a low temperature storage cabinet having a freezing cycle system composed of a compressor, a condenser, a throttle and an evaporator, a cabinet temperature sensor for detecting an inside temperature of the cabinet and for producing an electric signal indicative of the detected inside temperature, compressor control means responsive to the electric signal from said temperature sensor for activating the compressor in the freezing cycle system in response to rise of the inside temperature of the cabinet and for deactivating the compressor in response to a fall in the inside temperature of the cabinet, and an electric fan provided in the cabinet for circulating cooled air in the interior of the cabinet, wherein the low temperature storage cabinet comprises ambient temperature detection means provided on the cabinet to detect a temperature of outside air, and fan control means for controlling operation of the electric fan in the cabinet in accordance with a temperature of outside air detected by the ambient temperature detection means during deactivation of the compressor and for decreasing the rate of operation of the electric fan in accordance with a decrease of the temperature of outside air.

In each practical embodiment of the low temperature storage cabinets described above, it is preferable that the fan control means comprises means for intermittently operating the electric fan in the cabinet during deactivation of the compressor and for changing the operation time and the stopping time of the electric fan to control the rate of operation of the electric fan. It is also preferable that the fan control means comprises means for selectively effecting continual operation of the electric fan or intermittent operation of the electric fan during deactivation of the compressor to control the rate of operation of the electric fan.

According to a further aspect of the present invention, there is provided a low temperature storage cabinet having a freezing cycle system composed of a compressor, a condenser, a throttle and an evaporator, a cabinet temperature sensor for detecting an inside temperature of the cabinet and for producing an electric signal indicative of the detected inside temperature, temperature setting means for setting an inside temperature of the cabinet, compressor control means responsive to the electric signal from the cabinet temperature sensor for activating the compressor when the inside temperature of the cabinet rises in a nominal value more than an inside temperature set by the temperature setting means and for deactivating the compressor when the inside temperature of the cabinet falls in the nominal value less than the inside temperature set by the temperature setting means, and an electric fan provided in the cabinet for circulating cooled air in the interior of the cabinet, wherein the low temperature storage cabinet comprises refrigerant temperature detection means for detecting a temperature of refrigerant in the freezing cycle system, first fan control means for operating the electric fan in the cabinet at a predetermined rate of operation during deactivation of the compressor when the inside temperature set by the temperature setting means is less than a predetermined temperature, and second fan control means for decreasing the rate or operation of the electric fan in accordance with a decrease of the refrigerant temperature detected by the refrigerant temperature detection means during deactivation of the compressor when the inside temperature set by the temperature setting means is more than the predetermined temperature.

According to an aspect of the present invention, there is provided a low temperature storage cabinet having a freezing cycle system composed of a compressor, a condenser, a throttle and an evaporator, cabinet temperature sensor for detecting an inside temperature of the cabinet and for producing an electric signal indicative of the detected inside temperature, temperature setting means for setting an inside temperature of the cabinet, compressor control means responsive to the electric signal from the cabinet temperature sensor for activating the compressor when the inside temperature of the cabinet rises in a nominal value more than an inside temperature set by the temperature setting means and for deactivating the compressor when the inside temperature of the cabinet falls in the nominal value less than the inside temperature set by the temperature setting means, and an electric fan provided in the cabinet for circulating cooled air in the interior of the cabinet, wherein the low temperature storage cabinet comprises refrigerant pressure detection means for detecting pressure of refrigerant in the freezing cycle system, first fan control means for operating the electric fan in the cabinet at a predetermined rate of operation during deactivation of the compressor when the inside temperature set by the temperature setting means is less than a predetermined temperature, and second fan control means for decreasing the rate of operation of the electric fan in accordance with a decrease of the refrigerant pressure detected by the refrigerant pressure detection means during deactivation of the compressor when the inside temperature set by the temperature setting means is more than the predetermined value.

According to another aspect of the present invention, there is provided a low temperature storage cabinet having a freezing cycle system composed of a compressor, a condenser, a throttle and an evaporator, cabinet temperature sensor for detecting an inside temperature of the cabinet and for producing an electric signal indicative of the detected inside temperature, temperature setting means for setting an inside temperature of the cabinet, compressor control means responsive to the electric signal from the cabinet temperature sensor for activating the compressor when the inside temperature of the cabinet rises in a nominal value more than an inside temperature set by the temperature setting means and for deactivating said compressor when the inside temperature of the cabinet falls in the nominal value less than the inside temperature set by the temperature setting means, and an electric fan provided in the cabinet for circulating cooled air in the interior of the cabinet, wherein the low temperature storage cabinet comprises ambient temperature detection means for detecting a temperature of outside air, first fan control means for operating the electric fan in the cabinet at a predetermined rate of operation during deactivation of the compressor when the inside temperature set by the temperature setting means is less than a predetermined value, and second fan control means for decreasing the rate of operation of the electric fan in accordance with a decrease of the temperature of outside air detected by the ambient temperature detection means during deactivation of the compressor when the inside temperature set by the temperature setting means is more than the predetermined value.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
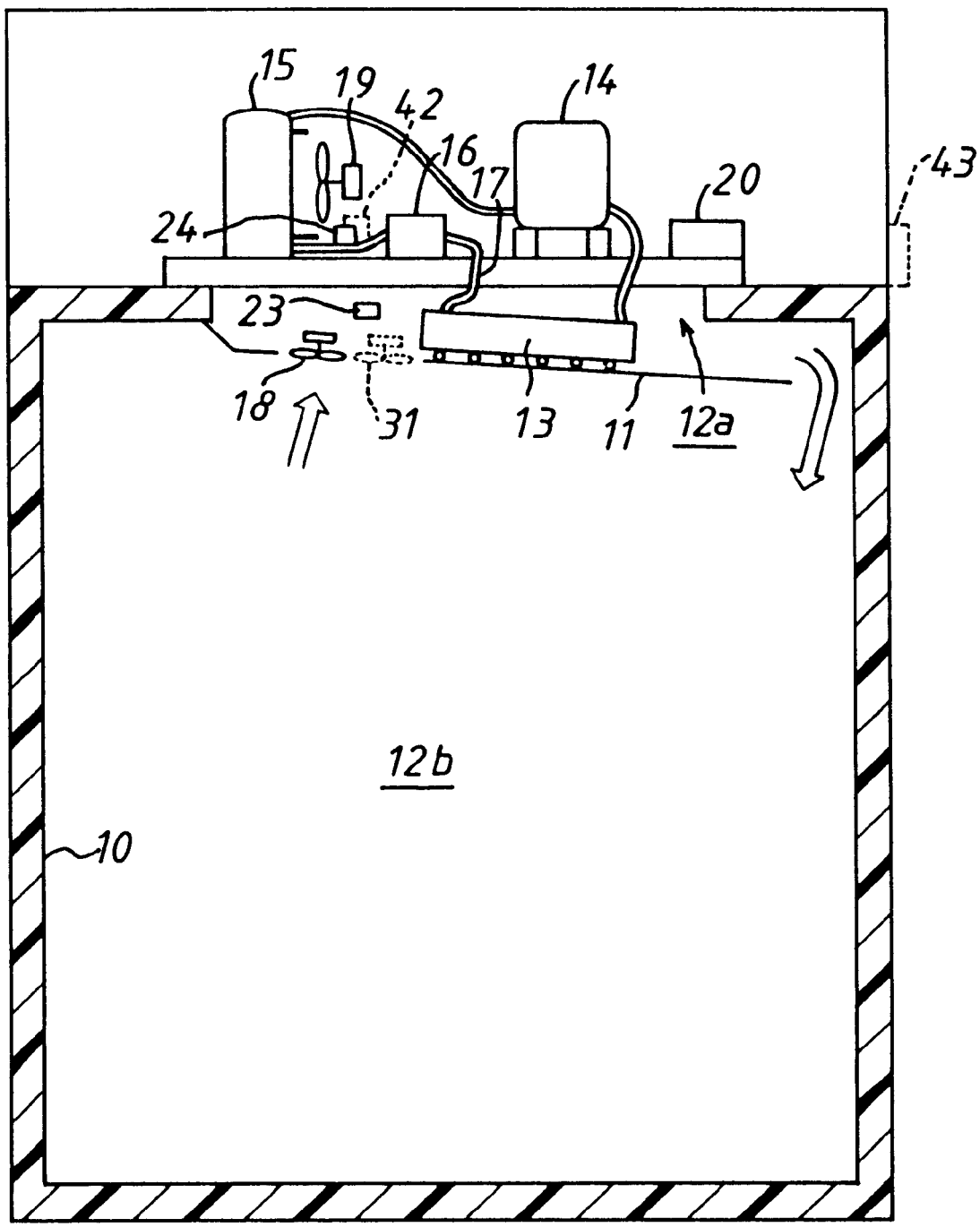
FIG. 1 is a vertical sectional view of a refrigerator in accordance with the present invention.

In FIG. 1 of the drawings, there is schematically illustrated a low temperature storage cabinet in the form of a refrigerator which includes a cabinet 10 the interior of which is subdivided by a partition plate 11 into a cooling compartment 12a and a storage compartment 12b for preservation of foodstuffs. Mounted on the partition plate 11 is an evaporator 13 which acts to evaporate compressed refrigerant supplied thereto from a compressor 14 through a condenser 15, a dryer 16 and a throttle 17 for cooling the interior of cooling compartment 12a and to recirculate the evaporated refrigerant into the compressor 14. In the refrigerator, a freezing cycle system is composed of the evaporator 13, compressor 14, condenser 15, dryer 16 and throttle 17. In the cabinet 10, an electric fan 18 is mounted on the partition plate 11 within the cooling compartment 12a to introduce the air from storage compartment 12b into the cooling compartment 12a and to circulate the cooled air from the cooling compartment 12a into the interior of storage compartment 12b. The condenser 15 is provided with an electric cooling fan 19.

Figure 2:
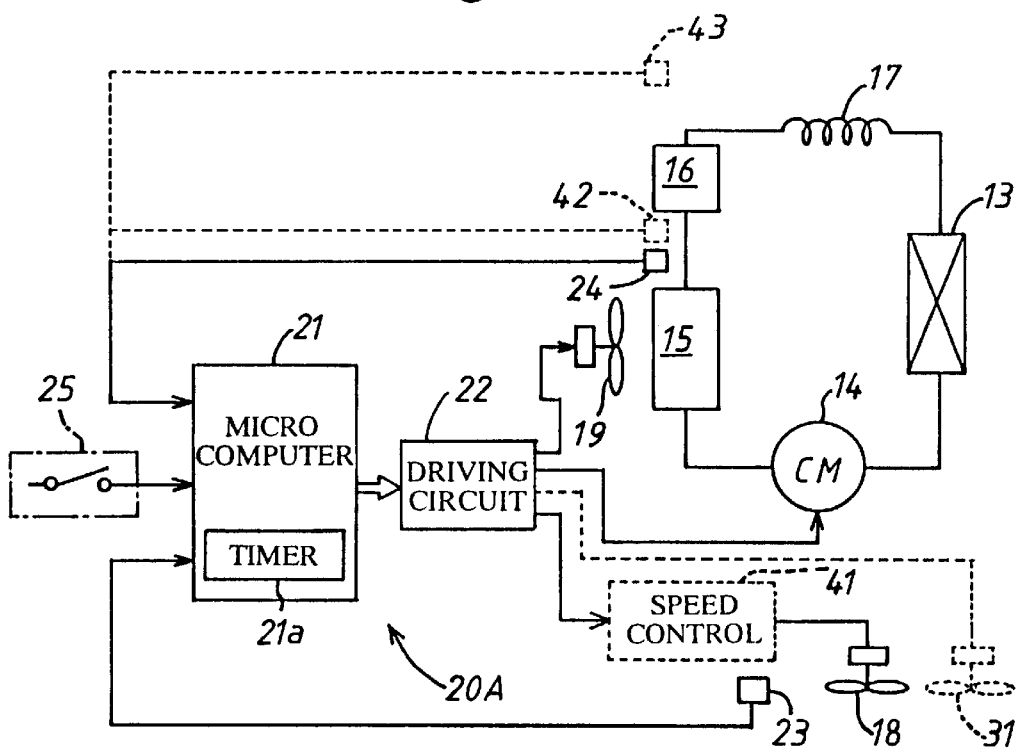
FIG. 2 is a block diagram of an electric control apparatus for the refrigerator shown in FIG. 1.

An electric control apparatus 20A for control of the compressor 14, the electric fan 18 in cabinet 10 and the cooling fan 19 of condenser 15 is contained in a control box 20 mounted within the refrigerator. As shown in FIG. 2, the electric control apparatus 20A includes a microcomputer 21 provided with a timer 21a and a driving circuit 22. The microcomputer 21 is applied with detection signals from a thermo-switch 23, a refrigerant temperature sensor 24 and a saving switch 25 to execute a main program shown by a flow chart in FIGS. 4 and 5 for control of each operation of the compressor 14, the electric fan 18 in cabinet 10 and the condenser fan 19.

As shown in FIG. 1, the thermo-switch 23 is arranged within the cooling compartment 12a to detect an inside temperature of the cooling compartment 12b and storage compartment 12b for producing an electric signal indicative of the inside temperature of the cabinet 10. The thermo-switch 23 is turned on when the inside temperature of the cabinet 10 rises more than a predetermined temperature and is turned off when the inside temperature of the cabinet 10 drops below the predetermined temperature. The refrigerant temperature sensor 24 is mounted on an outlet conduit of condenser 15 to detect a temperature of the refrigerant for producing an electric signal indicative of the refrigerant temperature. The saving switch 25 is mounted on an operation panel (not shown) to activate the refrigerator at a saving mode for reducing consumption of the electric power.

Figure 4:
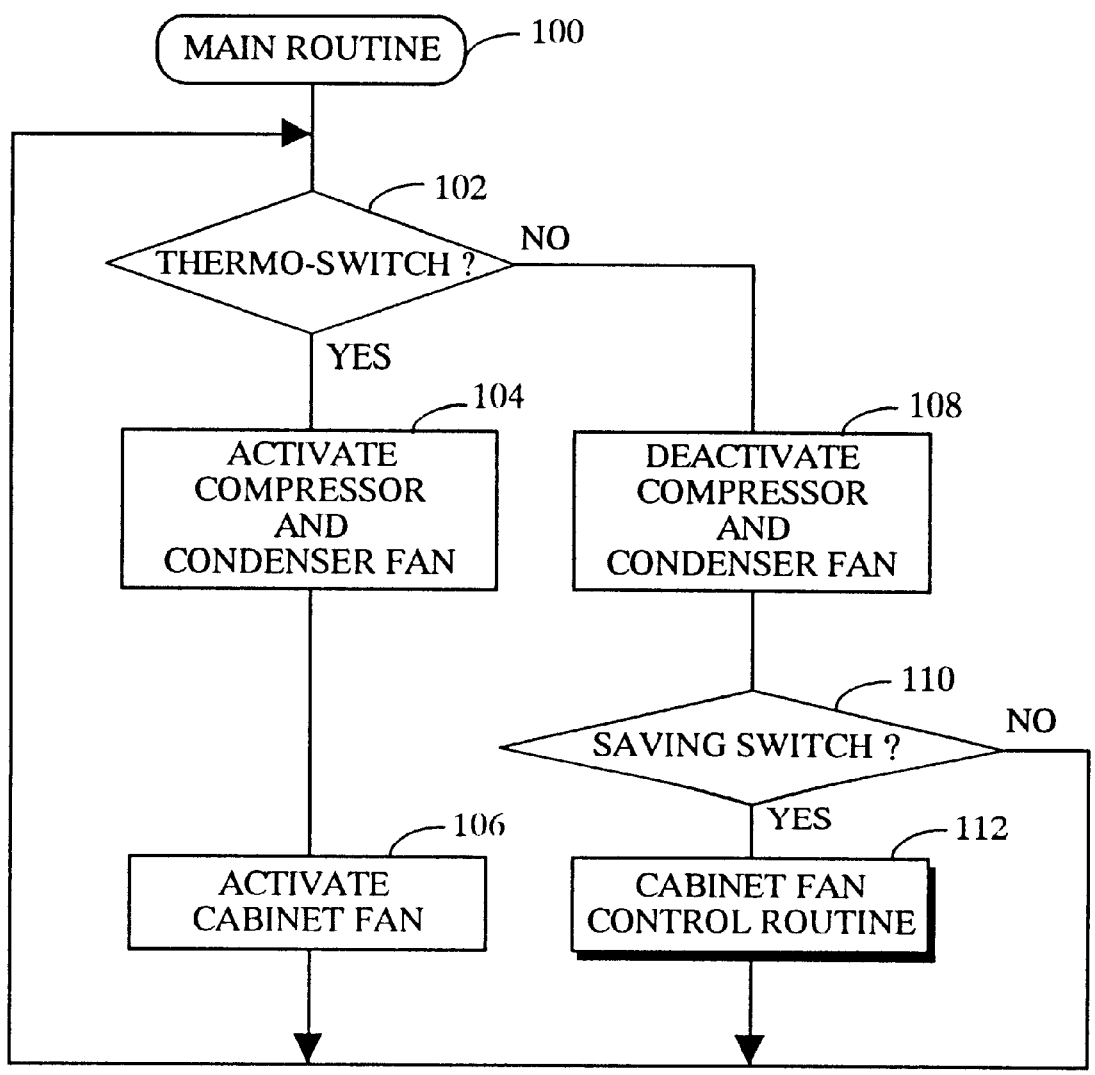
FIG. 4 is a flow chart of a main program executed by a microcomputer in the electric control apparatus shown in FIG. 2.

Assuming that a power source switch of the refrigerator has been closed, the microcomputer 21 starts to execute the main program at step 100 of FIG. 4 and repeats execution of processing at step 102 to 112. When the thermo-switch 23 is turned on in response to rise of the inside temperature of cabinet 10 during execution of the main program, the computer 21 determines a "Yes" answer at step 102 and maintains each operation of the compressor 14, the condenser fan 19 and the electric fan 18 in cabinet 10 by processing at step 104 and 106. Thus, the freezing cycle system is maintained in an activated condition to cool the interior of cooling compartment 12a, and the cooled air from cooling compartment 12a is circulated by operation of the electric fan 18 into the storage compartment 12b so that the inside temperature of cabinet 10 is uniformly lowered. When the thermo-switch 23 is turned off due to drop of the inside temperature of cabinet 10, the computer 21 determines a "No" answer at step 102 and stops each operation of the compressor 14 and condenser fan 19 at step 108 to deactivate the freezing cycle system and determines at step 110 whether the saving switch 25 has been turned on or not. If the answer at step 110 is "No", the computer 21 returns the program to step 102 and maintains the operation of the electric fan 18 in cabinet 10 even when the freezing cycle system is deactivated. When the thermo-switch 23 is turned on due to rise of the inside temperature of cabinet 10 caused by opening and closing of the cabinet door, the computer 21 determines a "Yes" answer at step 102 and activates the freezing cycle system by processing at step 104 and 106. With such control of the freezing cycle system, the inside temperature of cabinet 10 is maintained approximately at the predetermined temperature.

Figure 5:
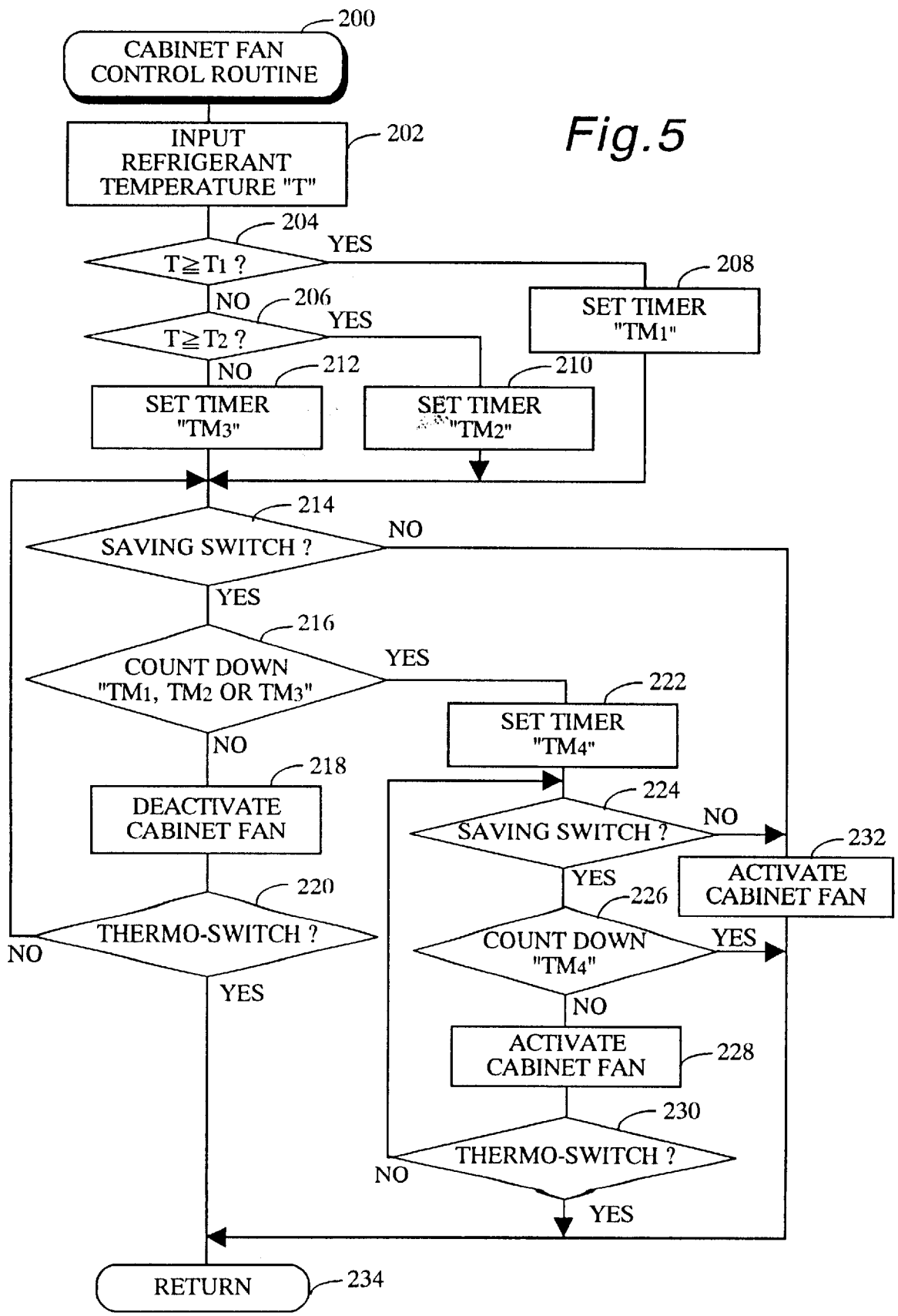
FIG. 5 is a flow chart of a cabinet fan control routine shown in FIG. 4.

When the saving switch 25 is turned on, the computer 21 determines a "Yes" answer at step 110 and causes the program to proceed to step 112 for execution of a cabinet fan control routine shown in FIG. 5. When started execution of the cabinet fan control routine at step 200, the computer 21 is applied with an electric signal indicative of a temperature T of the refrigerant detected by sensor 24 and executes processing at step 204 to 212 for setting a measurement time of timer 21a in accordance with the refrigerant temperature T. When the refrigerant temperature T is more than a first predetermined value $T_1$ (for instance, 50° C.), the measurement time is defined by a first predetermined time $TM_1$ (for instance, one and half minutes). When the refrigerant temperature T is less than the first predetermined value $T_1$ and more than a second predetermined value $T_2$ (for instance, 30° C.) less than the first predetermined value $T_1$, the measurement time is defined by a second predetermined time $TM_2$ (for instance, two and half minutes). When the refrigerant temperature T is less than the second predetermined value $T_2$, the measurement time is defined by a third predetermined time $TM_3$ (for instance, three minutes). Thus, the measurement time of timer 21a is successively increased in accordance with a decrease of the refrigerant temperature T.

After processing at step 204 to 212, the timer 21a starts to count down the measurement time, while the computer 21 repeats execution of processing at step 214 to 220 unless the saving switch 25 is turned off or the thermo-switch 23 is turned on. Thus, the electric fan 18 in cabinet 10 is deactivated by processing at 218 during execution of processing at step 214 to 220. When the timer 21a finishes countdown of the measurement time, the computer 21 determines a "Yes" answer at step 216 and causes the program to proceed to step 222.

At step 222, the computer 21 defines the measurement time of timer 21a as a fourth predetermined time TM4 (for instance, fifteen seconds) regardless of the refrigerant temperature T. In such an instance, the timer 21a starts to count down the measurement time $TM_4$, while the computer 21 repeats execution of processing at step 224 to 230 unless the saving switch 25 is turned off or the thermo-switch 23 is turned on. Thus, the electric fan 18 in cabinet 10 is operated by processing at step 228 during execution of processing at step 224 to 230. When the timer 21a finishes countdown of the measurement time, the computer 21 determines a "Yes" answer at step 226 and finishes execution of the cabinet fan control routine at step 234.

Figure 3:
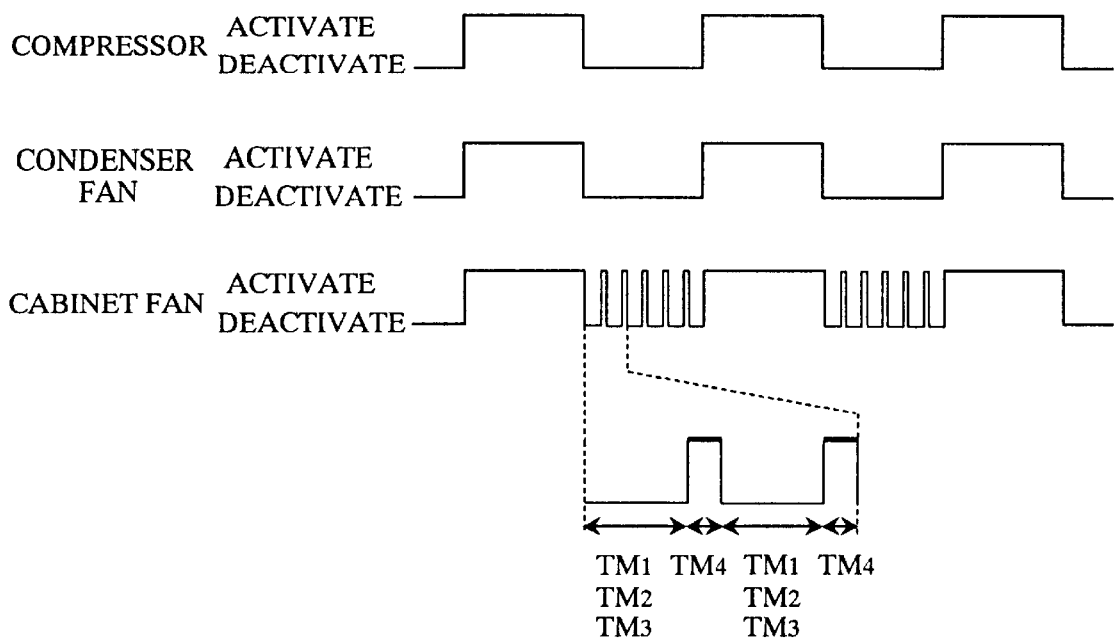
FIG. 3 is a time chart showing each operation of a refrigerant compressor, a condenser fan and an electric fan in the cabinet of the refrigerator.

When the saving switch 25 is turned on in a condition where the thermo-switch 23 has been turned off to deactivate the freezing cycle system, the electric fan 18 in cabinet 10 is operated for the fourth predetermined time $TM_4$ and is intermittently stopped for the predetermined times $TM_1$, $TM_2$, $TM_3$. (see FIG. 3) When the thermo-switch 23 is turned on due to rise of the inside temperature of cabinet 10 during execution of processing at step 214 to 220 and 224 to 230, the computer 21 determines a "Yes" answer respectively at step 220 and 230 and finishes execution of the cabinet fan control routine at step 234. In such an instance, the computer 21 determines a "Yes" answer at step 102 of FIG. 4 and activates the freezing cycle system. If the saving switch 25 is turned off during execution of processing at step 214 to 220 and 224 to 230, the computer 21 determines a "No" answer respectively at step 214 and 224 and finishes execution of the cabinet fan control routine at step 234 after operated the electric fan 18 in cabinet 10. In this instance, the electric fan 18 in cabinet 10 is operated even when the freezing cycle system is deactivated.

As is understood from the above description, when the saving switch 25 is turned on, the electric fan 18 in cabinet 10 is intermittently operated and stopped in a condition where the freezing cycle system is deactivated. Although in such an instance, the operation time of electric fan 18 is defined by the predetermined time $TM_4$, the stopping time of electric fan 18 is successively increased to the predetermined times $TM_1$, $TM_2$ and $TM_3$ in accordance with a decrease of the refrigerant temperature T. As a result, the rate of operation of electric fan 18 is decreased in accordance with a fall in the refrigerant temperature T.

The refrigerant temperature T utilized for control of the rate of operation of electric fan 18 in cabinet 10 rises in a condition where the difference in temperature between the upper and lower compartments of cabinet 10 increases due to rise of the temperature of outside air or opening and closing of the cabinet door. Thus, the rate of operation of the compressor 14 in the freezing cycle system is increased in accordance with rise of the refrigerant temperature T. Accordingly, even when the rate of operation of electric fan 18 is decreased in accordance with a fall in the refrigerant temperature, the inside temperature of cabinet 10 is uniformly maintained at the predetermined value without increasing the difference in temperature between the upper and lower compartments of cabinet 10. This is useful to automatically reduce consumption of the electric power in a reliable manner.

Although in the foregoing embodiment, the stopping time of electric fan 18 is changed at three steps in accordance with the refrigerant temperature T in a condition where the saving switch 25 has been turned on, the stopping time of electric fan 18 may be changed at two steps or more than four steps.

Figure 6:
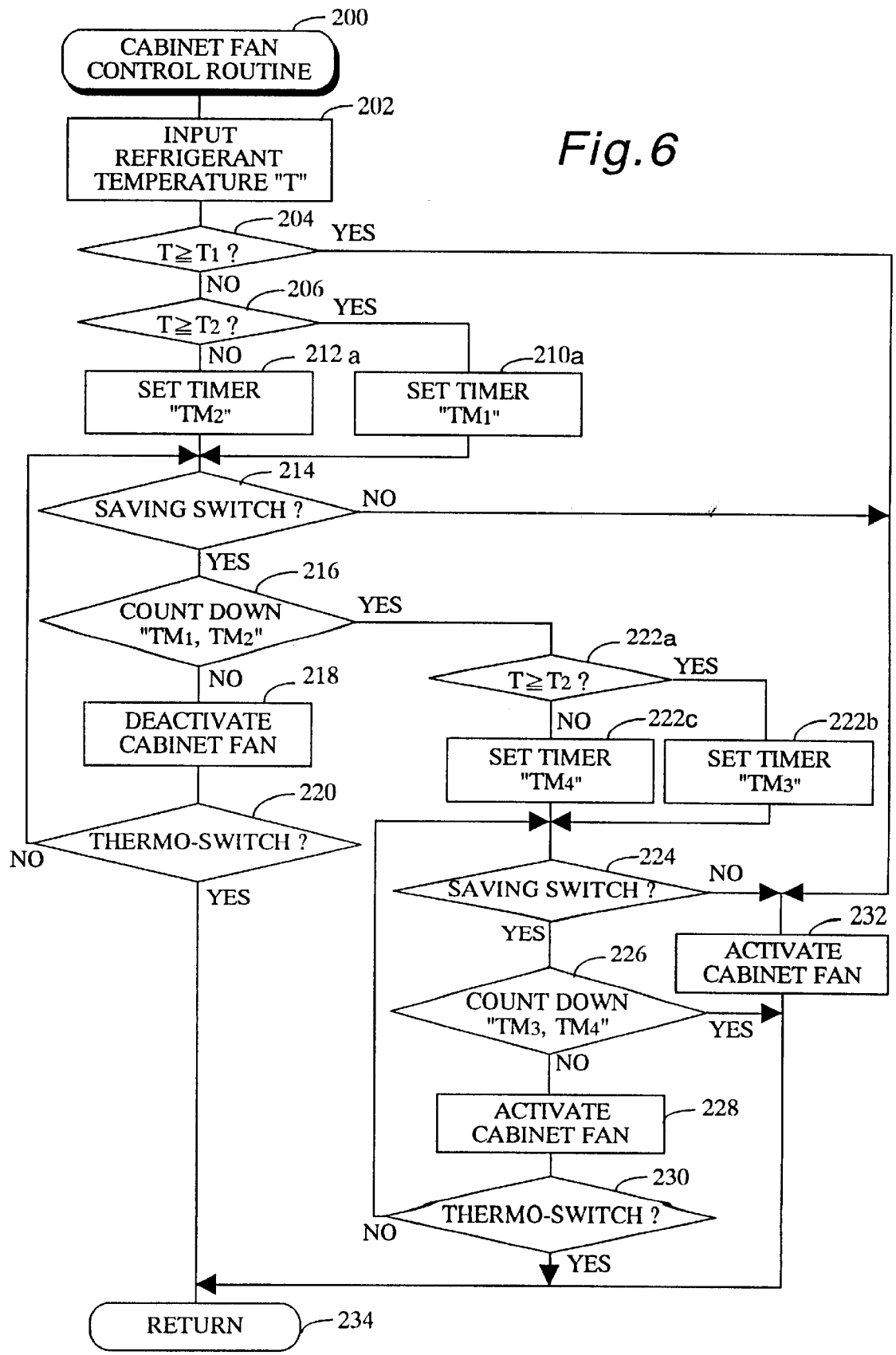
FIG. 6 is a flow chart of a modification of the cabinet fan control routine shown in FIG. 5.

Illustrated in FIG. 6 is a modification of the cabinet fan control routine shown in FIG. 5, wherein the computer 21 is programmed to continuously operate the electric fan 18 in cabinet 10 by processing at step 232 when the refrigerant temperature T is more than the predetermined value $T_1$ (for instance, 50° C.). During execution of the cabinet fan control routine shown in FIG. 5, the computer 21 determines at step 204 whether the refrigerant temperature T is more than the predetermined value $T_1$ or not. If the answer at step 204 is "Yes", the computer 21 operates the electric fan 18 in cabinet 10 at step 232 in the same manner as in the foregoing embodiment and finishes execution of the cabinet fan control routine at step 234. If the refrigerant temperature is less than the predetermined value $T_1$, the computer 21 determines a "No" answer at step 204 and executes processing at step 206, 210a, 212a, 214 to 220 and processing at step 222a, 222b, 222c, 224 to 230 to intermittently operate the electric fan 18 in cabinet 10. As a result, during deactivation of the freezing cycle system, the rate of operation of electric fan 18 in cabinet 10 is decreased in accordance with a fall in the refrigerant temperature T.

In addition, the cabinet fan control routine shown in FIG. 6 is characterized in that both the stopping time and the operation time of electric fan 18 are changed in accordance with the refrigerant temperature T during deactivation of the freezing cycle system. When the refrigerant temperature T is less than the predetermined value $T_1$ and more than the predetermined value $T_2$ (for instance, 30° C.), the predetermined value $TM_1$ (for instance, two and half minutes) is set as the measurement time of timer 21a by processing at step 204, 206 and 210a. When the refrigerant temperature T is less than the predetermined value $T_2$, the predetermined value $TM_2$ (for instance, three minutes) is set as the measurement time of timer 21a by processing at step 204, 206 and 212a. Subsequently, the stopping time of electric fan 18 is set in accordance with the refrigerant temperature T by processing at step 216 and 218.

After processing at step 216, the computer 21 determines at step 222a whether the refrigerant temperature T is more than the predetermined value $T_2$ or not. If the answer at step 222a is "Yes", the predetermined value $TM_3$ (for instance, twenty minutes) is set as the measurement time of timer 21a by processing at step 222b. If the answer at step 222a is "No", the predetermined value $TM_4$ (for instance, fifteen minutes) is set as the measurement time of timer 21a by processing at step 222c. Subsequently, the operation time of electric fan 18 is set in accordance with the refrigerant temperature T by processing at step 226 and 228.

With such execution of the cabinet fan control routine shown in FIG. 6, the rate of operation of electric fan 18 in cabinet 10 is determined by both the stopping time and the operation time described above during deactivation of the freezing cycle system. That is to say, when the refrigerant temperature T is less than the predetermined value $T_1$ and more than the predetermined value $T_2$, the rate of operation of electric fan 18 is defined by $TM_3/(TM_1+TM_3)$. When the refrigerant temperature T is less than the predetermined value $T_2$, the rate of operation of electric fan 18 is defined by $TM_4/(TM_2+TM_4)$. As the values $TM_1$–$TM_4$ are determined in such a manner that the rate of operation $TM_3/(TM_1+TM_3)$ becomes larger than the rate of operation $TM_4/(TM_2+TM_4)$, the rate of operation of the electric fan 18 during deactivation of the freezing cycle system is decreased in accordance with a fall in the refrigerant temperature in the same manner as in the foregoing embodiment. Accordingly, consumption of the electric power can be automatically reduced without increasing the difference in temperature between the upper and lower compartments of cabinet 10.

Figure 7:
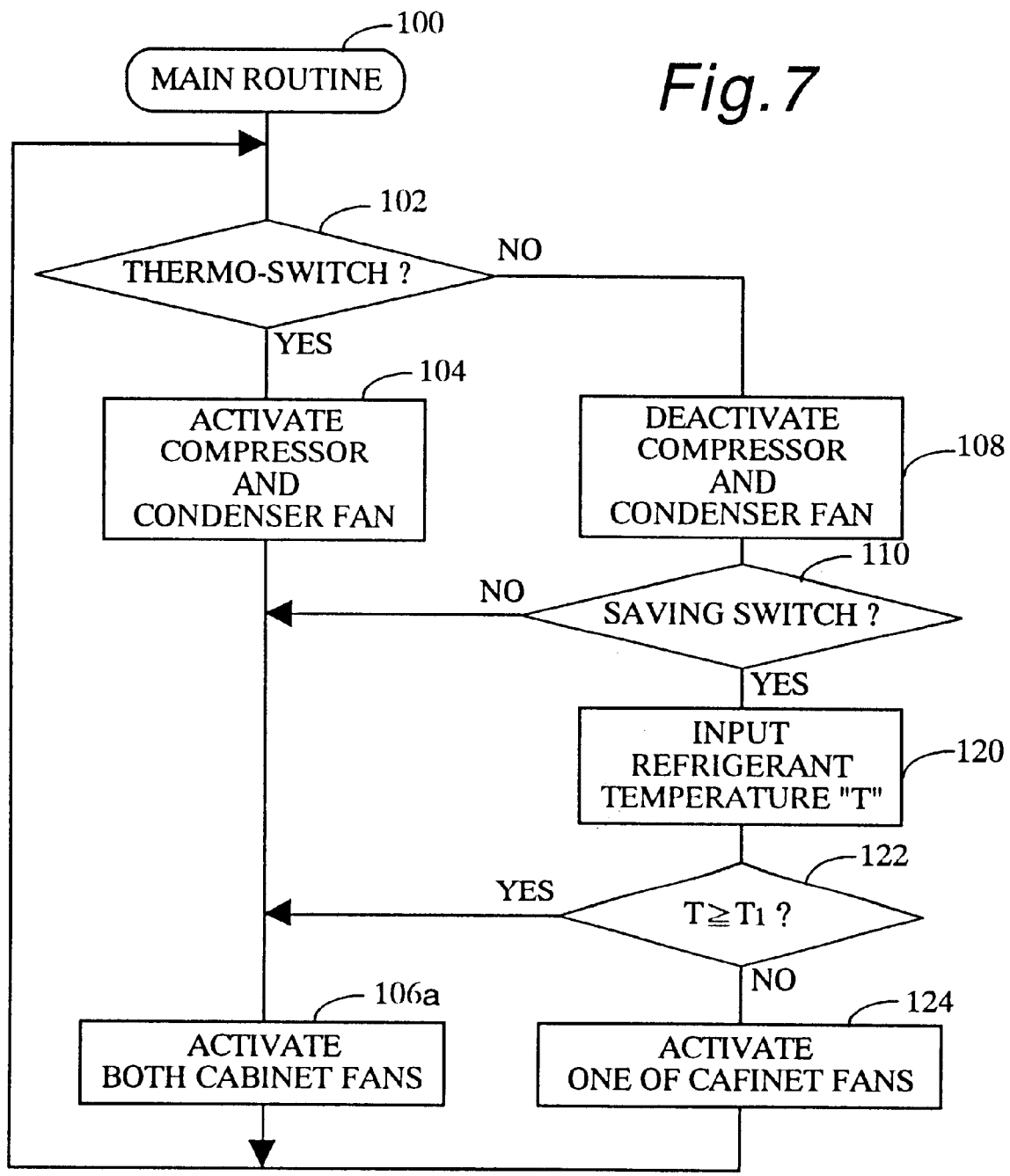
FIG. 7 is a flow chart of a modification of the main program shown in FIG. 4.

In a practical embodiment of the present invention, an additional electric fan 31 may be further provided within the cabinet 10 as shown by broken lines in FIG. 1, and the main program shown in FIG. 4 may be modified as shown in FIG. 7 to selectively operate the electric fans 18 and 31 in cabinet 10 in accordance with the refrigerant temperature T in a condition where the saving switch 25 is turned on during deactivation of the freezing cycle system. During execution of the modified main program, the computer 21 activates and deactivates the freezing cycle system in response to the detection signal applied from the thermo-switch 23 by processing at step 102, 104 and 108. In a condition where the freezing cycle system is being activated or the saving switch 23 is turned off during deactivation of the freezing cycle system, the computer 21 operates both the electric fans 18 and 31 in cabinet 10 by processing at step 106a. When the saving switch 25 is turned on during deactivation of the freezing cycle system, the computer 21 determines a "Yes" answer at step 110, reads out the refrigerant temperature T from sensor 24 and determines at step 122 whether the refrigerant temperature T is more than the first predetermined value $T_1$ or not. When the answer at step 122 is "Yes", the computer 21 operates both the electric fans 18 and 31 in cabinet 10 by processing at step 106a. When the answer at step 122 is "No", the computer 21 operates only one of the electric fans 18 and 31 by processing at step 124. Thus, the rate of operation of electric fans 18 and 31 in cabinet 10 is decreased in accordance with a decrease of the refrigerant temperature T during deactivation of the freezing cycle system to reduce consumption of the electric power.

Figure 8:
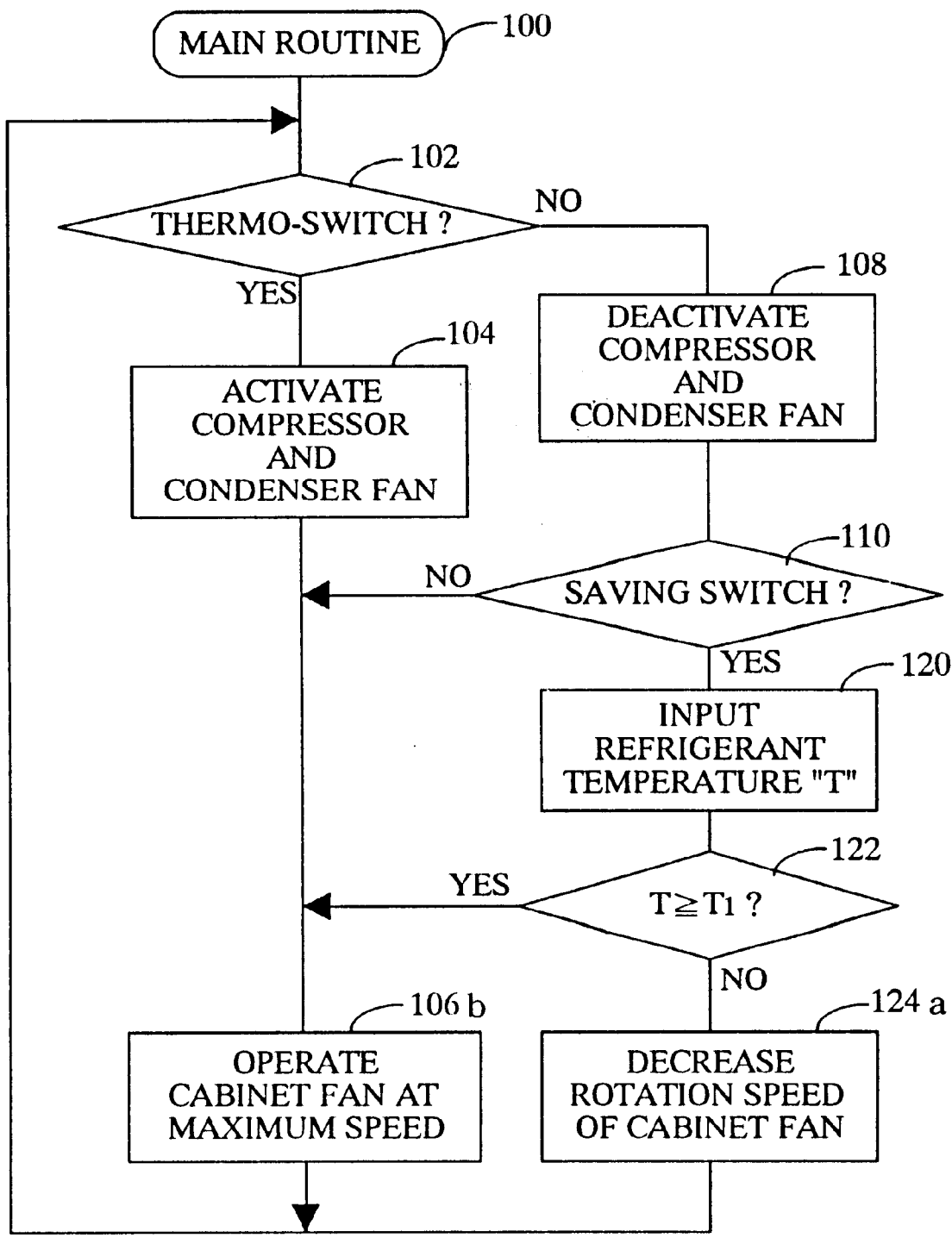
FIG. 8 is a flow chart of another modification of the main program shown in FIG. 4.

In the practical embodiment described above, a speed control circuit 41 may be disposed between the driving circuit 22 and the electric fan 18 in cabinet 10, as shown by broken lines in FIG. 2. In this embodiment, the speed control circuit 41 is provided in the form of an inverter or phase control circuit for controlling the rotation speed of electric fan 18, and the main program of FIG. 4 is modified as shown in FIG. 8 to control the rotation speed of electric fan 18 in accordance with the refrigerant temperature T in a condition where the saving switch 25 is turned on during deactivation of the freezing cycle system. During execution of the modified main program, the computer 21 activates and deactivates the freezing cycle system in response to the detection signal applied from the thermo-switch 23 by processing at step 102, 104 and 108. In a condition where the freezing cycle system is being activated or the saving switch 25 is maintained in its off-position during deactivation of the freezing cycle system, the computer 21 causes the speed control circuit 41 at step 106b to operate the electric fan 18 in cabinet 10 at a maximum speed. When the saving switch 25 is turned on during deactivation of the freezing cycle system, the computer 21 determines a "Yes" answer at step 110, reads out the refrigerant temperature T from sensor 24 at step 120 and determines at step 122 whether the refrigerant temperature T is more than the first predetermined value $T_1$ (for instance, 40° C.) or not. When the answer at step 122 is "Yes", the computer 21 causes the speed control circuit 41 at step 106b to rotate the electric fan 18 at the maximum speed. When the answer at step 122 is "No", the computer 21 causes the speed control circuit 41 at step 124a to decrease the rotation speed of the electric fan 18 in cabinet 10. Thus, the rate of operation of electric fan 18 in cabinet 10 is decreased in accordance with a decrease of the refrigerant temperature T during deactivation of the freezing cycle system to reduce consumption of the electric power.

In a modification of the foregoing embodiment, the refrigerant temperature sensor 24 may be replaced with a refrigerant pressure sensor 42 disposed between the condenser 15 and dryer 16 for detecting refrigerant pressure in the freezing cycle system, as shown by broken lines in FIGS. 1 and 2. In this modification, the computer 21 is programmed to decrease the rate of operation of electric fan 18 in cabinet 10 in accordance with a decrease of refrigerant pressure P detected by sensor 42.

In another modification of the foregoing embodiment, an outside air temperature sensor 43 may be provided on the cabinet 10 for detecting the temperature of outside air as shown by broken lines in FIGS. 1 and 2. In this modification, the computer 21 is programmed to decrease the rate of operation of electric fan 18 in cabinet 10 in accordance with a decrease of the outside air temperature detected by sensor 43.

Figure 9:
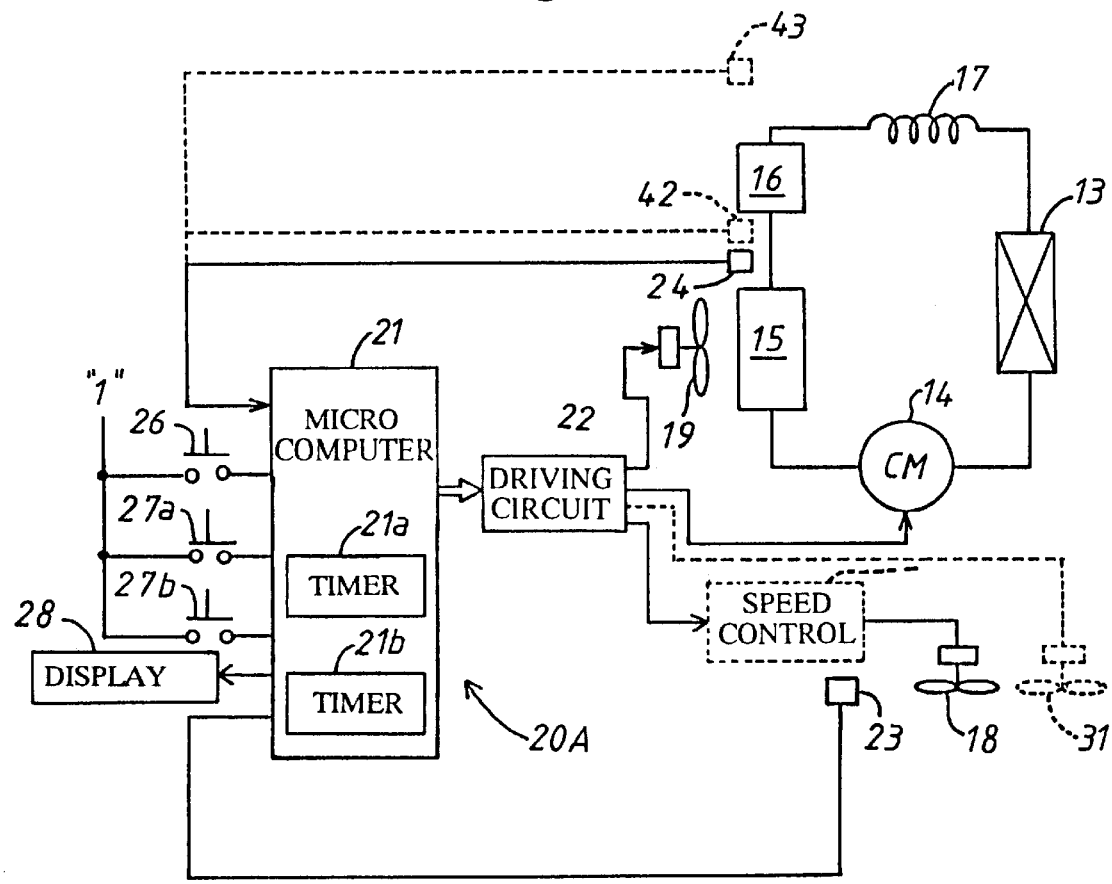
FIG. 9 is a block diagram of a modification of the electric control apparatus shown in FIG. 2.

Illustrated in FIG. 9 is a modification of the electric control apparatus shown in FIG. 2, wherein the computer 21 is connected to a temperature setting switch 26, a temperature rising switch 27a and a temperature drop switch 27b for setting an inside temperature of the cabinet 10 in a desired value and a display 28 for indicating thereon the inside temperature of the cabinet 10 and a temperature setting mode, and wherein the thermo-switch 23 is replaced with an cabinet temperature sensor 23a mounted within the cooling compartment 12a to detect an inside temperature C of the cabinet 10. In this modification, the computer 21 is provided with an additional timer 21b for execution of a timer interruption program shown in FIG. 12 and is programmed to execute a main program and a cabinet fan control routine respectively shown in FIGS. 10 and 11 and to execute the timer interruption program under control of the timer 21b.

Figure 10:
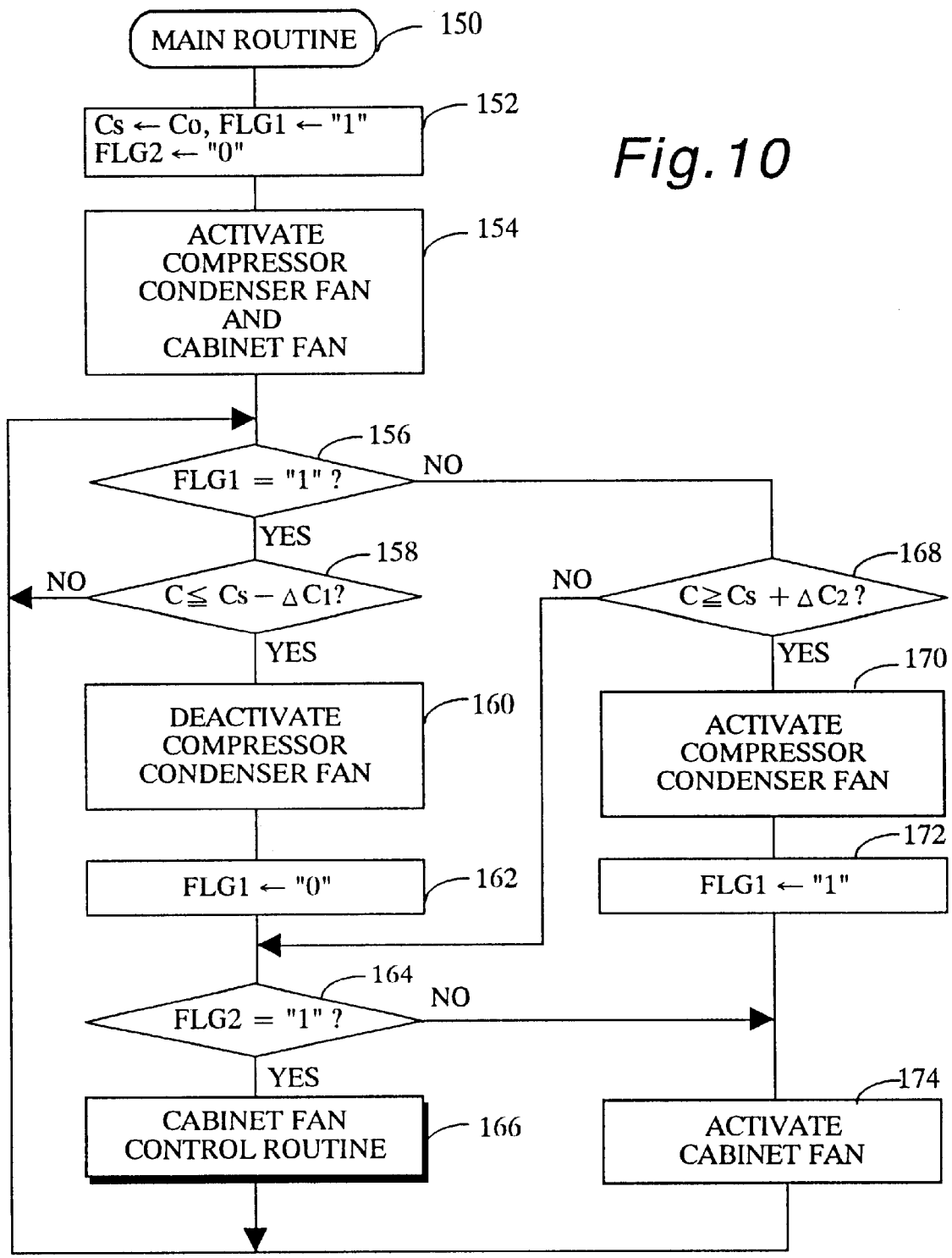
FIG. 10 is a flow chart of a main program executed by the microcomputer shown in FIG. 9.

Assuming that the power source switch of the refrigerator has been closed, the computer 21 starts to execute the main program shown in FIG. 10 at step 150 and sets an initial value Co indicative of a standard inside temperature of the cabinet 10 as a set temperature Cs at step 152. At step 152, the computer 21 further sets a first flag FLG1 to "1" and a second flag FLG2 to "0". The first flag FLG1 represents activation of the compressor 14 when it is set to "1" and represents deactivation of the compressor 14 when it is set to "0". The second flag FLG2 represents a non-saving mode of the electric power when it is set to "0" and represents a saving mode of the electric power when it is set to "1". Thus, the computer 21 activates the compressor 14, condenser fan 19 and cabinet fan 18 at step 154 to cool the interior of cooling compartment 12a and to circulate the cooled air into the storage compartment 12b from the cooling compartment 21a.

After processing at step 152 and 154, the computer 21 repeats execution of processing at step 156 to 174. If the first flag FLG1 is "1", the computer 21 determines a "Yes" answer at step 156 and determines at step 158 whether or not an inside temperature C of the cabinet 10 detected by sensor 23a is less than a lower limit temperature Cs−ΔC1 defined by a difference between the set temperature Cs and a nominal temperature ΔC1 (for instance, 2° C.). If the answer at step 158 is "No", the computer 21 repeats processing at step 156 and 158. If the answer at step 158 is "Yes", the computer 21 deactivates the compressor 14 and condenser fan 19 at step 160 and sets the first flag FLG1 to "0" indicative of deactivation of the compressor 14 at step 162. Subsequently, the computer 21 determines at step 164 whether the second flag FLG2 is "1" or not. If the second flag FLG2 is set as "0" at the initial setting, the computer 21 determines "No" answer at step 164 and maintains the operation of cabinet fan 18 at step 174.

When the program is returned to step 156 after processing at step 174, the computer 21 determines a "No" answer at step 156 and causes the program to proceed to step 168. At step 168, the computer 21 determines whether or not the inside temperature of the cabinet 10 detected by sensor 23a is more than an upper limit temperature Cs+ΔC2 defined by the sum of the set temperature Cs and a nominal temperature ΔC2 (for instance, 1.5° C.). If the answer at step 168 is "No", the computer 21 repeats processing at step 164, 174, 156 and 168 during which the freezing cycle system is deactivated.

When the inside temperature C of the cabinet 10 becomes more than the upper limit temperature Cs+ΔC2, the computer 21 determines a "Yes" answer at step 168 and activates the compressor 14 and condenser fan 19 at step 170 to cool the interior of cooling compartment 12a and storage compartment 12b. After processing at step 170, the computer 21 sets the first flag FLG1 to "1" at step 172 and maintains the operation of cabinet fan 18 by processing at step 174. With such processing at step 156 to 164 and 168 to 174, the freezing cycle system is repeatedly activated and deactivated to maintain the inside temperature C of cooling compartment 12a and storage compartment 12b approximately at the set temperature Cs between the lower limit temperature Cs−ΔC1 and the upper limit temperature Cs+ΔC2.

Figure 12:
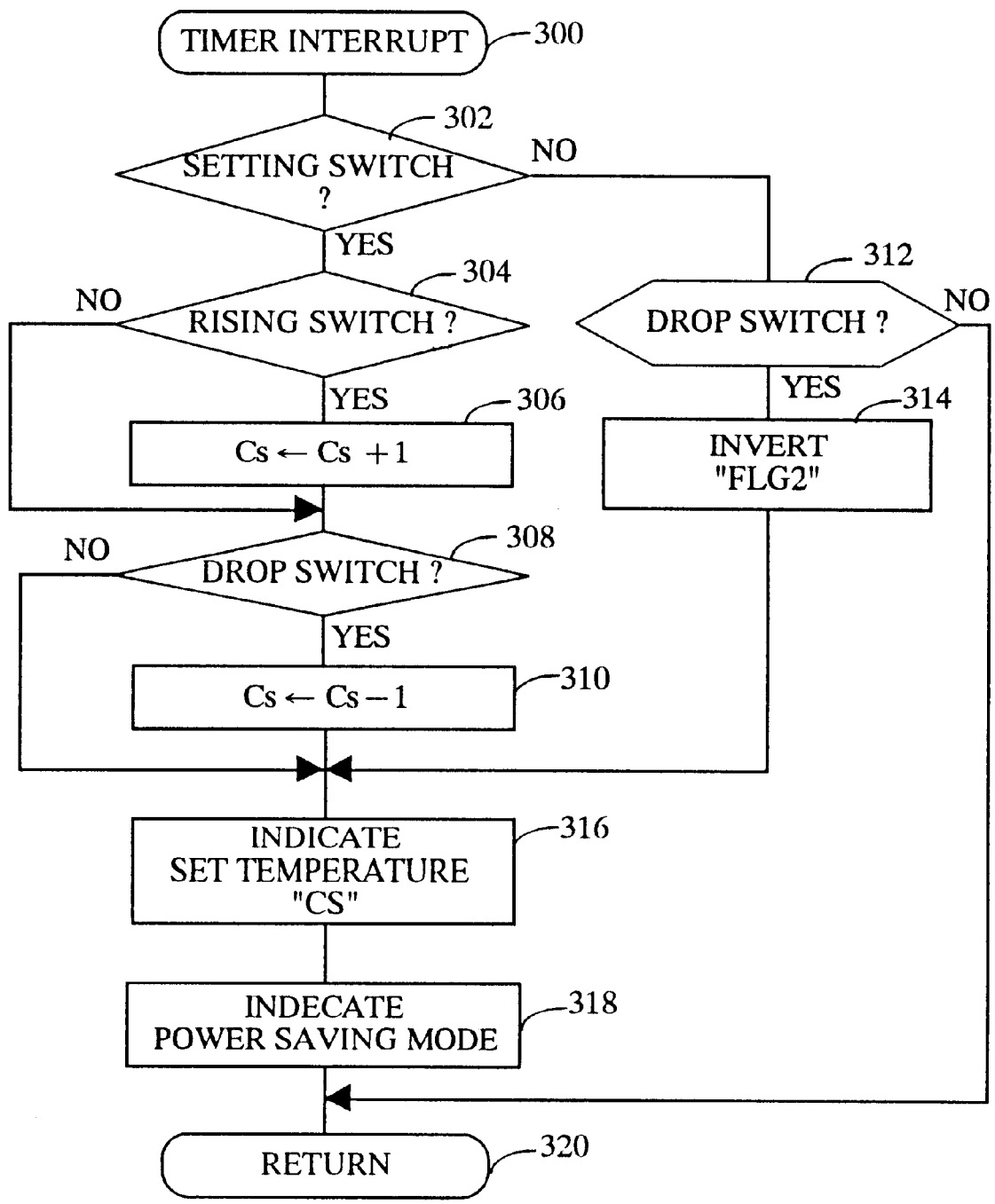
FIG. 12 is a flow chart of a timer interruption program executed by the microcomputer shown in FIG. 9.

During execution of the main program described above, the computer 21 executes the timer interruption program of FIG. 12 under control of the timer 21b at a predetermined time interval. When started to execute the timer interruption program at step 300, the computer 21 determines at step 302 whether the temperature setting switch 26 has been turned on or not. If the answer at step 302 is "No", the computer 21 determines at step 312 whether the drop switch 27b is maintained in its on-position for a predetermined time (for instance, five minutes) or not. If the answer at step 312 is "No", the computer 21 finishes execution of the timer interruption program at step 320. If the answer at step 302 is "Yes", the computer 21 rises the set temperature Cs by processing at step 304 and 306. When the rising switch 27a is turned on in a condition where the temperature setting switch 26 is being turned on, the computer 21 determines a "Yes" answer at step 304 and rises the set temperature Cs with "1" at each lapse of a predetermined time. If the rising switch 27a is not turned on, the computer 21 determines a "No" answer at step 304 and lowers the set temperature Cs by processing at step 308 and 310. When the drop switch 27b is turned on in a condition where the temperature setting switch 26 is being turned on, the computer 21 determines a "Yes" answer at step 308 and lowers the set temperature Cs with "1" at each lapse of the predetermined time by processing at step 310. If the drop switch 27b is not turned on, the computer 21 determines a "No" answer at step 310 and causes the program to proceed to step 316.

As step 316, the computer 21 causes the display 28 to indicate the set temperature Cs on the display panel. After processing at step 316, the computer 21 causes the display 28 at step 318 to indicate whether the power saving mode is selected or not. When the power saving mode is not selected, the computer 21 causes the display to put out a decimal point in a lower order of the set temperature Cs. When the power saving mode is selected, the computer 21 causes the display to put on the decimal point.

When the set temperature Cs is changed by processing at step 302 to 310, the computer 21 executes processing at step 156 to 164 and 168 to 174 of FIG. 10 to maintain the inside temperature C of cooling compartment 12a and storage compartment 12b approximately at the set temperature Cs. When the drop switch 27b is maintained in its on-position for a predetermined time in a condition where the temperature setting switch 27 is maintained in its off-position, the computer 21 determines a "Yes" answer at step 312 and inverts the second flag FLG2 from "0" to "1" or vice versa at step 314. When the second flag FLG2 is set to "1", the computer 21 determines a "Yes" answer at step 164 of FIG. 10 and executes at step 166 a cabinet fan control routine shown In FIG. 11. The cabinet fan control routine of FIG. 11 is substantially the same as that of FIG. 5, expect for processing at step 242 to 248.

Figure 11:
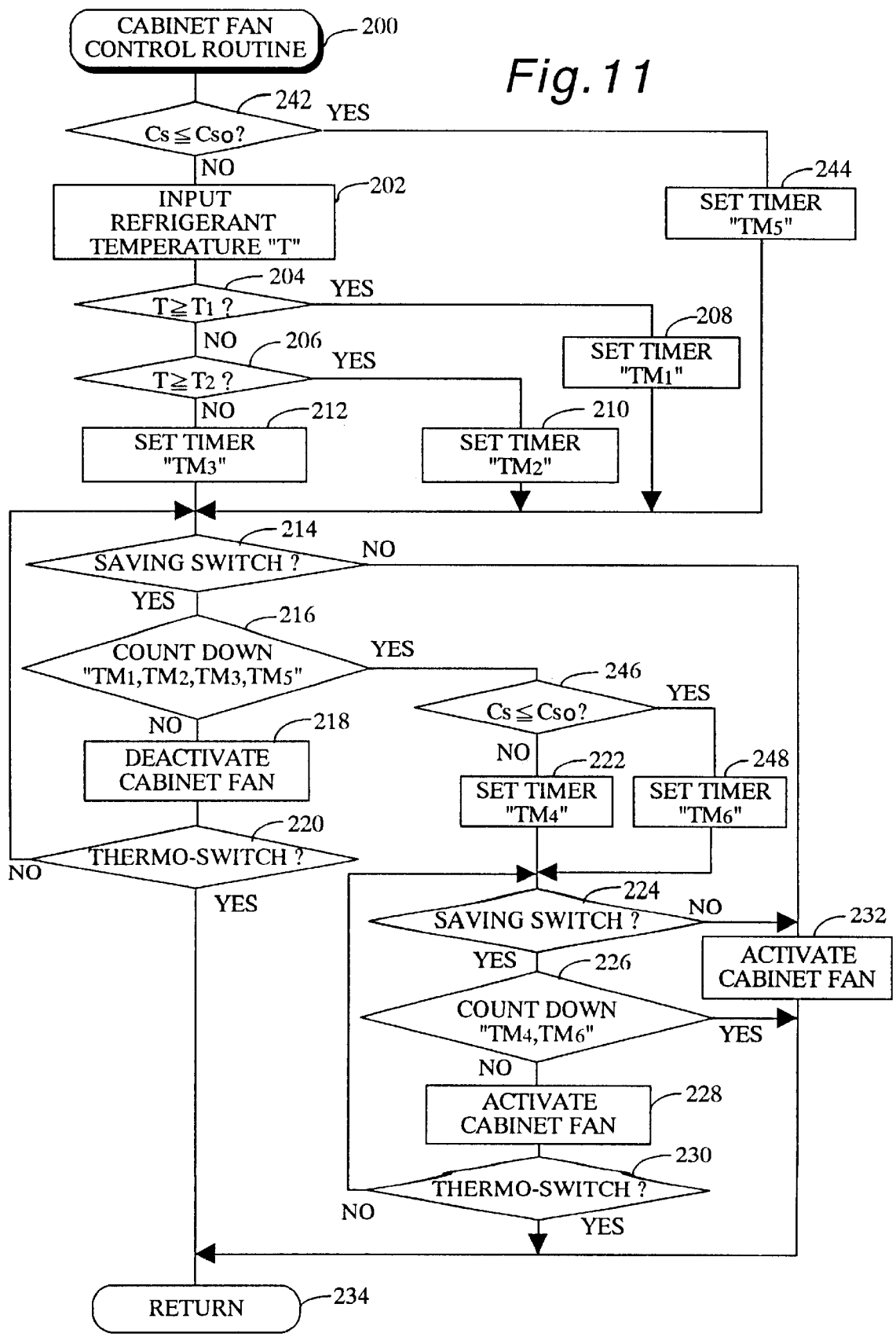
FIG. 11 is a flow chart of a cabinet fan control routine shown in FIG. 10.

When started to execute the cabinet fan control routine of FIG. 11 at step 200, the computer 21 determines at step 242 whether the set temperature Cs is less than a predetermined value Cso (for instance, 0° C.) or not. If the answer at step 242 is "Yes", the computer 21 sets a predetermined time $TM_5$ as the measurement time of timer 21a at step 244 and causes the program to proceed to step 214. If the answer at step 242 is "No", the computer 21 executes processing at step 202 to 212 in the same manner as in the foregoing embodiment for setting the predetermined time $TM_1$, $TM_2$ or $TM_3$. In this instance, the predetermined time $TM_5$ is set as a smaller value (for instance, one and half minutes) than the first predetermined time $TM_1$. Accordingly, if the set temperature Cs is less than the predetermined value Cso, the stopping time of electric fan 18 defined by processing at step 216 and 218 becomes less than a minimum stopping time defined in a condition where the set temperature Cs is higher than the predetermined time Cso.

When the program proceeds to step 246 after processing at step 216, the computer 21 determines whether the set temperature Cs is less than the predetermined value Cso (for instance, 0° C.) or not. If the answer at step 246 is "Yes", the computer 21 sets a predetermined time $TM_6$ as the measurement time of timer 21a at step 248 and causes the program to proceed to step 224. If the answer at step 246 is "No", the computer 21 executes processing at step 222 in the same manner as in the foregoing embodiment for setting the fourth predetermined time $TM_4$ as the measurement time of timer 21a. In this instance, the predetermined time $TM_6$ is set as a larger value (for instance, fifteen seconds) than the fourth predetermined time $TM_4$. Accordingly, if the set temperature Cs is less than the predetermined value Cso, the operation time of electric fan 18 defined by processing at step 226 and 228 becomes more than that in a condition where the set temperature Cs is higher than the predetermined value Cso.

As a result, when the set temperature Cs is less than the predetermined value Cso at the power saving mode, the rate of operation of electric fan 18 during deactivation of the compressor 14 is fixed to a relatively high value regardlessly of the refrigerant temperature T. Thus, even when the inside temperature of cabinet 10 is set at a lower value than 0° C. for preserving fresh foods such as fish, meat and the like in a slightly frozen condition, fluctuation of the inside temperature of storage compartment 12b caused by intermittent operation of the electric fan 18 is restrained to prevent the preserved fresh foods from melting or freezing. In addition, when the set temperature Cs is higher than the predetermined value Cso, the rate of operation of electric fan 18 in cabinet 10 is decreased in accordance with a decrease of the refrigerant temperature T in the same manner as in the foregoing embodiment to automatically reduce consumption of the electric power.

Figure 13:
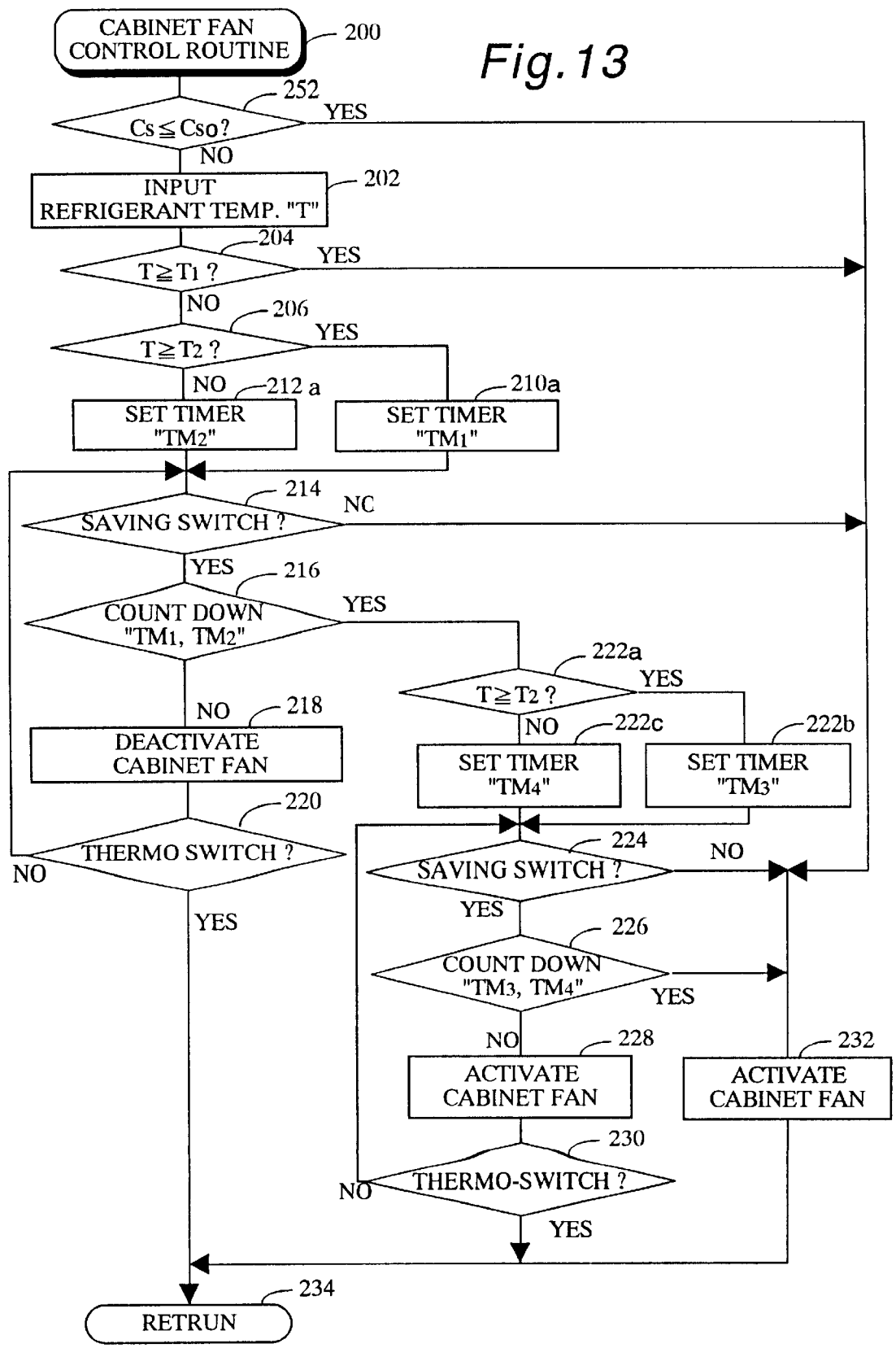
FIG. 13 is a flow chart of a modification of the cabinet fan control routine shown in FIG. 11.

Illustrated in FIG. 13 is a modification of the cabinet fan control routine of FIG. 6, wherein processing at step 252 is added before processing at step 202. At step 252, the computer 21 determines whether the set temperature Cs is less than the predetermined value Cso (for instance, 0° C.) or not. If the answer at step 252 is "Yes", the computer 21 causes the program to proceed to step 232 for maintaining the operation of electric fan 18 in cabinet 10. If the answer at step 252 is "No", the computer 21 executes processing at step 202 to 230 in the same manner as described above for intermittently operating the electric fan 18 in cabinet in accordance with the refrigerant temperature T. Thus, even when the inside temperature of cabinet 10 is set at a lower temperature than 0° C. for preserving fresh foods such as fish, meat and the like in a slightly frozen condition, fluctuation of the inside temperature of cabinet 10 is restrained to prevent the preserved foods from melting or freezing. In addition, when the set temperature Cs is higher than the predetermined value Cso, the rate of operation of electric fan 18 in cabinet 10 is decreased in accordance with a decrease of the refrigerant temperature T to automatically reduce consumption of the electric power.

Figure 14:
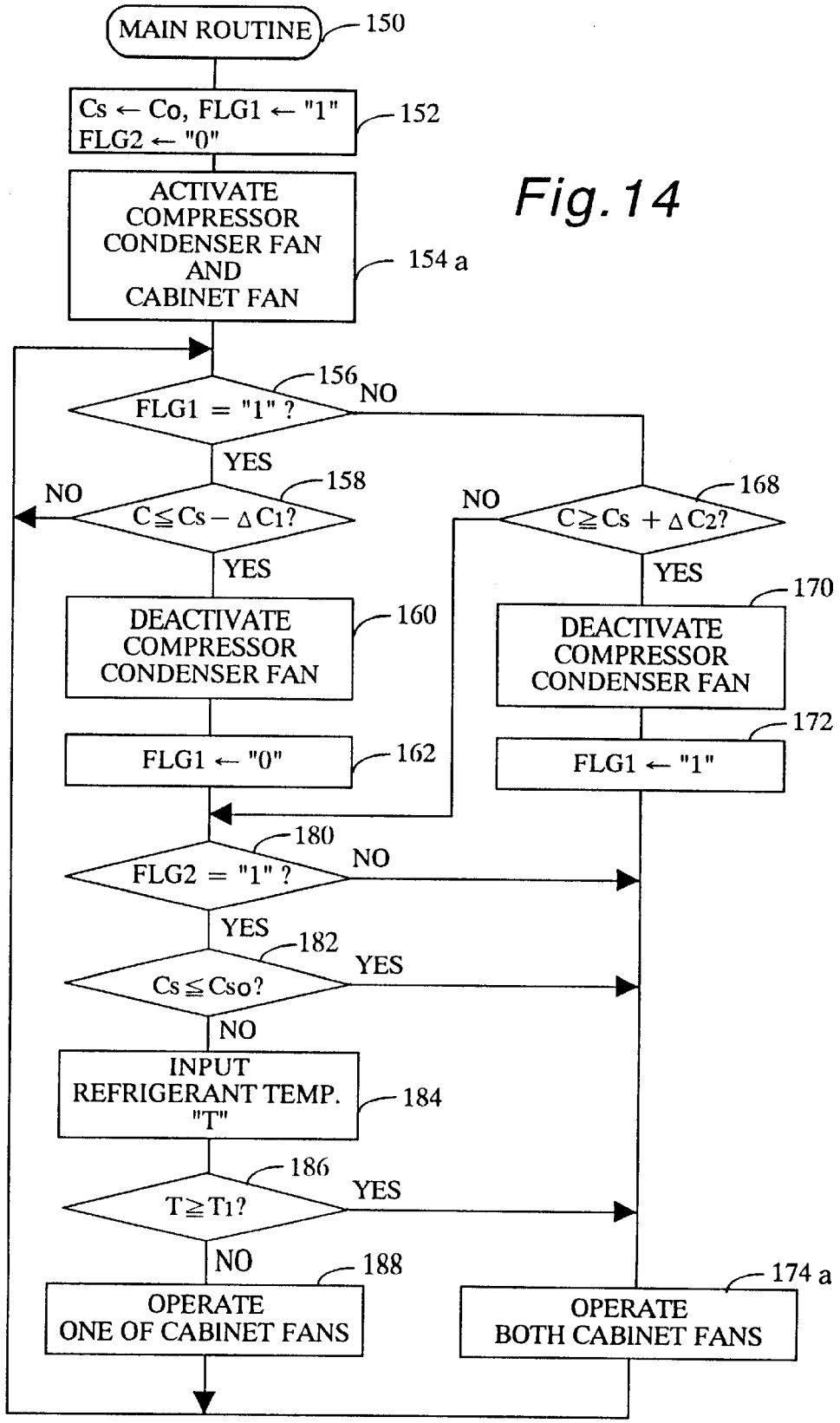
FIG. 14 is a flow chart of a modification of the main program executed by the microcomputer shown in FIG. 9.

Illustrated in FIG. 14 is a modification of the main program shown in FIG. 10 for control of the electric fans 18 and 19 provided in the cabinet 10 as shown in FIGS. 1 and 9. During execution of the main program of FIG. 14, the computer 21 executes the timer interruption program of FIG. 12. In this modification, the main program is programmed to selectively operate the electric fans 18 and 19 in accordance with the set temperature Cs and refrigerant temperature T at the power saving mode during deactivation of the freezing cycle system.

During execution of the main program of FIG. 14, the computer 21 intermittently activates and deactivates the freezing cycle system in accordance with the inside temperature of cabinet 10 by processing at step 152 to 162 and 168 to 172. When the freezing cycle system is activated or the second flag FLG2 is set as "0" during deactivation of the freezing cycle system, the computer 21 operates both the electric fans 18 and 19 in cabinet 10 by processing at step 174a. When the second flag FLG2 is set as "1" during deactivation of the freezing cycle system, the computer 21 determines a "Yes" answer at step 180 and determines at step 182 whether the set temperature Cs is less than the predetermined value Cso as in the foregoing modification. If the answer at step 182 is "Yes", the computer 21 operates both the electric fans 18 and 19 in cabinet 10 by processing at step 174a. If the answer at step 182 is "No", the computer 21 reads out the refrigerant temperature T detected by sensor 24 at step 184 and selectively operates the electric fans 18 and 19 in accordance with the refrigerant temperature T by processing at step 186, 174a and 188.

With such control of the electric fans 18 and 19 as described above, even when the inside temperature of cabinet 10 is set at a lower temperature than 0° C. for preserving fresh foods such as fish, meat and the like in a lightly frozen condition, fluctuation of the inside temperature of storage compartment 12b is retrained to prevent the preserved foods from melting or freezing.

Figure 15:
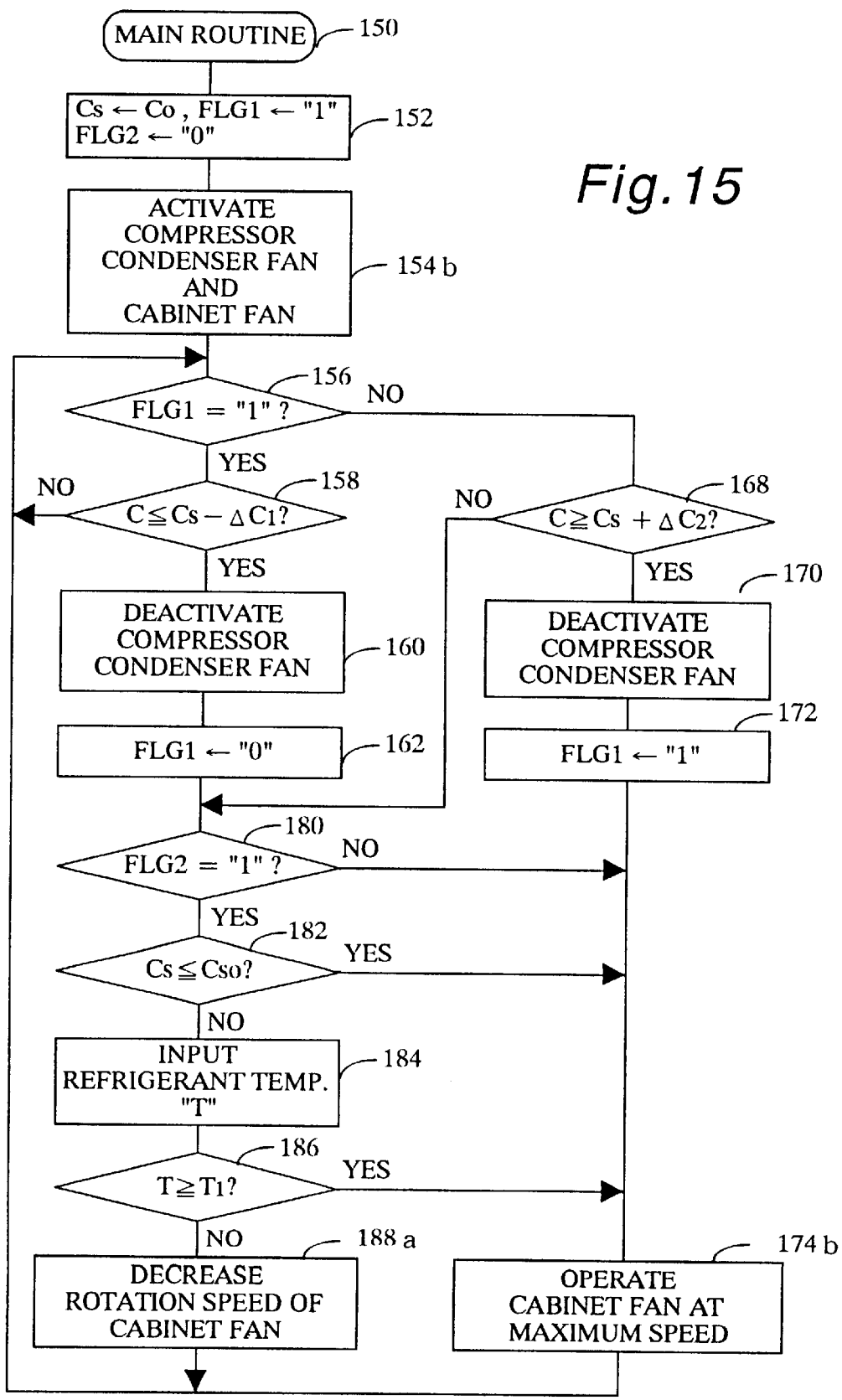
FIG. 15 is a flow chart of another modification of the main program executed by the microcomputer shown in FIG. 9.

Illustrated in FIG. 15 is another modification of the main program shown in FIG. 10 for control of the electric fan 18 in the electric control apparatus shown in FIG. 9. During execution of the main program of FIG. 15, the computer 21 executes the timer interruption program of FIG. 2. In this modification, the main program is programmed to control the rotation speed of electric fan 18 in accordance with the set temperature Cs and refrigerant temperature T when the freezing cycle system is deactivated at the power saving mode.

During execution of the main program of FIG. 15, the computer 21 intermittently activates and deactivates the freezing cycle system in accordance with the inside temperature C of cabinet 10 by processing at step 152 to 162 and 168 to 172. When the freezing cycle system is activated or the second flag FLG 2 is set as "0" during deactivation of the freezing cycle system, the computer 21 operates the electric fan 18 in cabinet 10 at a maximum rotation speed by processing at step 174b. When the second flag FLG2 is set as "1" during deactivation of the freezing cycle system, the computer 21 executes processing at step 182 to 186 to decrease the rotation speed of electric fan 18 under control of the speed control circuit 41 when the refrigerant temperature T is less than the predetermined value $T_1$ in a condition where the set temperature Cs is higher than the predetermined value Cso. When the refrigerant temperature T is more than the predetermined value $T_1$ or the set temperature Cs is lower than the predetermined value Cso, the computer 21 operates the electric fan 18 at the maximum rotation speed by processing at step 174b.

With such control of the electric fan 18 as described above, even when the inside temperature of cabinet 10 is set at a lower temperature than 0° C. for preserving fresh foods such fish, meat and the like in a slightly frozen condition, fluctuation of the inside temperature of cabinet 10 is restrained to prevent the preserved foods from melting or freezing. In addition, when the set temperature Cs is higher than the predetermined value Cso to preserve fresh foods without causing any spoil thereof, the rate of operation of the electric fan 18 is decreased in accordance with a decrease of the refrigerant temperature T to automatically reduce consumption of the electric power.

What is claimed is:

1. A low temperature storage cabinet having a freezing cycle system composed of a compressor, a condenser, a throttle and an evaporator, a cabinet temperature sensor for detecting an inside temperature of the cabinet and for producing an electric signal indicative of the detected inside temperature, compressor control means responsive to the electric signal from said temperature sensor for activating the compressor in the freezing cycle system in response to rise of the inside temperature of the cabinet and for deactivating the compressor in response to a fall in the inside temperature of the cabinet, and an electric fan provided in the cabinet for circulating cooled air in the interior of the cabinet, wherein the low temperature storage cabinet comprises:
refrigerant temperature detection means provided in the freezing cycle system to detect a temperature of refrigerant in the freezing cycle system; and
fan control means for controlling operation of said electric fan in the cabinet in accordance with a temperature of refrigerant detected by said detection means during deactivation of said compressor and for decreasing the rate of operation of said electric fan in accordance with a decrease of the refrigerant temperature.

2. A low temperature storage cabinet as claimed in claim 1, wherein said fan control means comprises means for intermittently operating said electric fan in the cabinet during deactivation of said compressor and for changing the operation time and the stopping time of said electric fan to control the rate of operation of said electric fan in accordance with the refrigerant temperature.

3. A low temperature storage cabinet as claimed in claim 1, wherein said fan control means comprises means for selectively effecting continual operation of said electric fan or intermittent operation of said electric fan during deactivation of said compressor to control the rate of operation of said electric fan in accordance with the refrigerant temperature.

4. A low temperature storage cabinet as claimed in claim 1, wherein a plurality of electric fans are provided in the cabinet for circulating cooled air in the interior of the cabinet, and wherein said fan control means comprises means for selectively operating said electric fans during deactivation of said compressor to control the rate of operation of said electric fans in accordance with the refrigerant temperature.

5. A low temperature storage cabinet as claimed in claim 1, wherein said fan control means comprises means for controlling the rotation speed of said electric fan during deactivation of said compressor to control the rate of operation of said electric fan in accordance with the refrigerant temperature.

6. A low temperature storage cabinet having a freezing cycle system composed of a compressor, a condenser, a throttle and an evaporator, a cabinet temperature sensor for detecting an inside temperature of the cabinet and for producing an electric signal indicative of the detected inside temperature, compressor control means responsive to the electric signal from said temperature sensor for activating the compressor in the freezing cycle system in response to rise of the inside temperature of the cabinet and for deactivating the compressor in response to a fall in the inside temperature of the cabinet, and an electric fan provided in the cabinet for circulating cooled air in the interior of the cabinet, wherein the low temperature storage cabinet comprises:
refrigerant pressure detection means provided in the freezing cycle system to detect pressure of refrigerant in the freezing cycle system; and
fan control means for controlling operation of said electric fan in the cabinet in accordance with refrigerant pressure detected by said pressure detection means during deactivation of said compressor and for decreasing the rate of operation of said electric fan in accordance with a decrease of the refrigerant pressure.

7. A low temperature storage cabinet having a freezing cycle system composed of a compressor, a condenser, a throttle and an evaporator, a cabinet temperature sensor for detecting an inside temperature of the cabinet and for producing an electric signal indicative of the detected inside temperature, compressor control means responsive to the electric signal from said temperature sensor for activating the compressor in the freezing cycle system in response to rise of the inside temperature of the cabinet and for deactivating the compressor in response to a fall in the inside temperature of the cabinet, and an electric fan provided in the cabinet for circulating cooled air in the interior of the cabinet, wherein the low temperature storage cabinet comprises:
ambient temperature detection means provided on the cabinet to detect a temperature of outside air; and
fan control means for controlling operation of said electric fan in the cabinet in accordance with a temperature of outside air detected by said ambient temperature detection means during deactivation of said compressor and for decreasing the rate of operation of said electric fan in accordance with a decrease of the temperature of outside air.

8. A low temperature storage cabinet having a freezing cycle system composed of a compressor, a condenser, a throttle and an evaporator, a cabinet temperature sensor for detecting an inside temperature of the cabinet and for producing an electric signal indicative of the detected inside temperature, temperature setting means for setting an inside temperature of the cabinet, compressor control means responsive to the electric signal from said cabinet temperature sensor for activating said compressor when the inside temperature of the cabinet rises in a nominal value more than an inside temperature set by said temperature setting means and for deactivating said compressor when the inside temperature of the cabinet falls in the nominal value less than the inside temperature set by said temperature setting means, and an electric fan provided in the cabinet for circulating cooled air in the interior of the cabinet, wherein the low temperature storage cabinet comprises:
refrigerant temperature detection means provided in the freezing cycle system for detecting a temperature of refrigerant in the freezing cycle system;
first fan control means for operating said electric fan in the cabinet at a predetermined rate of operation during deactivation of said compressor when the inside temperature set by said temperature setting means is less than a predetermined temperature; and
second fan control means for decrease the rate of operation of said electric fan in accordance with a decrease of the refrigerant temperature detected by said refrigerant temperature detection means during deactivation of said compressor when the inside temperature set by said temperature setting means is more than the predetermined temperature.

9. A low temperature storage cabinet having a freezing cycle system composed of a compressor, a condenser, a throttle and an evaporator, cabinet temperature sensor for detecting an inside temperature of the cabinet and for producing an electric signal indicative of the detected inside temperature, temperature setting means for setting an inside temperature of the cabinet, compressor control means responsive to the electric signal from said cabinet temperature sensor for activating said compressor when the inside temperature of the cabinet rises in a nominal value more than an inside temperature set by said temperature setting means and for deactivating said compressor when the inside temperature of the cabinet falls in the nominal value less than the inside temperature set by said temperature setting means, and an electric fan provided in the cabinet for circulating cooled air in the interior of the cabinet, wherein the low temperature storage cabinet comprises:
refrigerant pressure detection means provided in the freezing cycle system for detecting pressure of refrigerant in the freezing cycle system;
first fan control means for operating said electric fan in the cabinet at a predetermined rate of operation during deactivation when the inside temperature set by said temperature setting means is less than a predetermined temperature; and
second fan control means for decreasing the rate of operation of said electric fan in accordance with a decrease of the refrigerant pressure detected by said refrigerant pressure detection means during deactivation of said compressor when the inside temperature set by said temperature setting means is more than the predetermined temperature.

10. A low temperature storage cabinet having a freezing cycle system composed of a compressor, a condenser, a throttle and an evaporator, cabinet temperature sensor for detecting an inside temperature of the cabinet and for producing an electric signal indicative of the detected inside temperature, temperature setting means for setting an inside temperature of the cabinet, compressor control means responsive to the electric signal from said cabinet temperature sensor for activating said compressor when the inside temperature of the cabinet rises in a nominal value more than an inside temperature set by said temperature setting means and for deactivating said compressor when the inside temperature of the cabinet falls in the nominal value less than the inside temperature set by said temperature setting means, and an electric fan provided in the cabinet for circulating cooled air in the interior of the cabinet, wherein the low temperature storage cabinet comprises:
ambient temperature detection means for detecting a temperature of outside air;
first fan control means for operating said electric fan in the cabinet at a predetermined rate of operation during deactivation of said compressor when the inside temperature set by said temperature setting means is less than a predetermined temperature; and
second fan control means for decreasing the rate of operation of said electric fan in accordance with a decrease of the temperature of outside air detected by said ambient temperature detection means during deactivation of said compressor when the inside temperature set by said temperature setting means is more than the predetermined temperature.

* * * * *